United States Patent [19]

Chasse

[11] 4,083,916

[45] Apr. 11, 1978

[54] METHOD FOR MOLDING A DECORATIVE LAYER

[76] Inventor: Arthur E. Chasse, 474 Hanover St., Manchester, N.H. 03104

[21] Appl. No.: 827,937

[22] Filed: Aug. 26, 1977

[51] Int. Cl.[2] .......................... B29C 5/00; B29D 3/00; B29D 9/10

[52] U.S. Cl. ....................................... 264/245; 156/63; 156/245; 156/247; 264/251; 264/261; 264/263; 264/275; 264/279

[58] Field of Search ............... 264/219, 245, 246, 271, 264/255, 275, 259, 250, 261, 263, 73, 251, 138, 299; 428/38; 156/63, 242, 245, 247, 539, 541

[56] References Cited

U.S. PATENT DOCUMENTS

| | | | |
|---|---|---|---|
| 3,546,051 | 12/1970 | Zufikon .................................. | 428/38 |
| 3,940,523 | 2/1976 | Lecoeur et al. ......................... | 428/38 |

*Primary Examiner*—W.E. Hoag
*Attorney, Agent, or Firm*—Thomas N. Tarrant

[57] ABSTRACT

A method of molding plastic layers such as used for table tops and the like in which decorative pattern dividing strips are applied to the mold surface in a support frame. The strips are adhesively secured to the mold surface and then the support frame removed after which the plastic mix is applied.

9 Claims, 7 Drawing Figures

METHOD FOR MOLDING A DECORATIVE LAYER

BACKGROUND OF THE INVENTION

1. Field of the Invention

The present invention relates to ornamental molded plastic layers suitable for use as table tops and the like.

2. Description of the Prior Art

In the distant past a considerable amount of artisan's skills frequently went into decorative table tops. Table tops inlaid with wood, marble, leather and ivory as well as table tops of assorted fanciful materials decorated by carving, painting and other art forms are all known. Most of these in the past entailed a great deal of hand labor. In order to provide quality ornamental products to the everyday man in accordance with the pressures of today, it is essential to find production processes that greatly reduce or eliminate the hand labor.

U.S. Pat. No. 3,940,523 of Lecoeur, et al describes a decorative object of plastic material in which decorative zones are delineated by plastic dividing strips. As described in that patent, considerable time and labor is required in producing the decorative object. Not only are portions produced in one step required to cure for extended time intervals before the next step, but the desired patterns produced by plastic strips apparently require manual positioning of the strips.

SUMMARY OF THE INVENTION

In accordance with the present invention a method of molding an ornamental plastic layer is provided in which a preassembled frame is used to position strips defining the decorative pattern upon the mold substrate where the strips are adhesively bonded so that the preassembled frame may be removed, leaving the strips to be embedded in the plastic of the finished layer. A second frame on the mold substrate serves to provide retaining walls to complete the mold. The ornamental layer is then made by filling the mold with a curable plastic mix with the dividing strips being used to separate colors or fill materials added to the mix. In some cases the dividing strips are themselves part or all of the ornamentation. Chips or granules of marble, glass, stone, plastic or other materials of variated shapes, colors and sizes may be added to the plastic mix before or after filling the mold in order to enhance the ornamental appearance.

Thus, it is an object of the invention to provide a method for economic production of an ornamental plastic layer in which divider strips are secured in the mold delineating the ornamental pattern and becoming part of the finished product.

Further objects and features of the invention will become apparent upon reading the following description together with the drawing.

DESCRIPTION OF THE PREFERRED EMOBODIMENTS

The present invention quickly and accurately positions divider strips inside a mold in the making of a molded plastic layer. While an endless variety of decorative designs are possible, the following description uses as an example a design having a diamond inside a rectangle.

Figure 1:
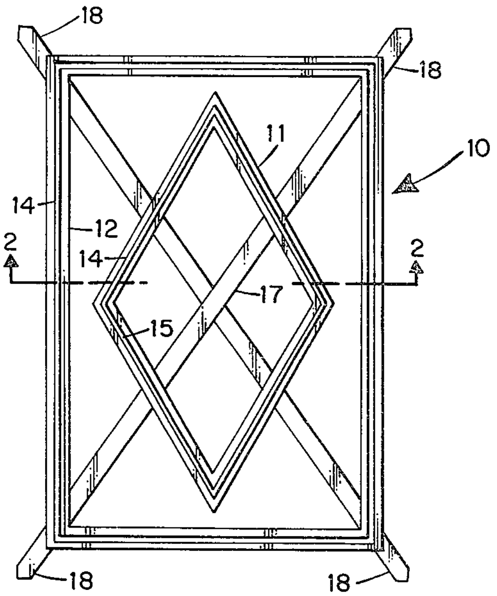
FIG. 1. is a plan view of frame assembly holding divider strips delineating an ornamental pattern according to the invention.

Referring to FIG. 1, frame assembly 10 is made up by first assembling diamond shaped frame 11 and then rectangular frame 12. Frames 11 and 12 are suitably assembled from wood and are glued or otherwise secured together in the desired shapes. Each of the pieces used to assemble frames 11 and 12 is first milled with a longitudinal groove 14 along the midline of one surface. Groove 14 is of a depth and width to secure decorative divider strips 15 and 16. Strips 15 and 16 are made of clear or colored plastic, metal, wood, glass or other suitable decorative rigid material. Strips 15 and 16 are preferably made 1 to 5 millimeters thick and 5 to 10 millimeters wide. Strips less than 1 mm thick usually lack sufficient rigidity to hold shape during molding. Thicknesses greater than 5 mm can be used to serve a decorative function, but are unnecessarily thick for most decorative schemes. The width of the strips is determined by their dividing function. The greater the depth of the plastic mix that is to be separated by the strips, the greater the width of the strip. When the plastic thickness is greater than 10 mm, it is usually more practical to apply undivided plastic mass for the remaining layer thickness.

Usual forms of spring retaining means or other clamping arrangements are contemplated as alternatives to grooves 14 for securing strips 15 and 16 to frames 11 and 12.

Frames 11 and 12 are secured to each other by ancillary framing construction 17 depicted as crossed wooden members intersecting both frames 11 and 12. In assembly, the frame members are cut so that the ancillary frame members interlock flush with each other and the members of frames 11 and 12. The entire frame assembly 10 is glued or otherwise secured together as a single unitary assembly.

Ancillary frame construction 17 has extended feet 18 for aligning frame assembly 10 with the retaining walls of a mold. Frame construction 17 is only exemplary and its functions can be provided by various forms of connecting and spacing blocks, arms or links. The exact form of the ancillary frame construction will depend considerably on the configuration of the decorative layer to be produced.

Figure 2:
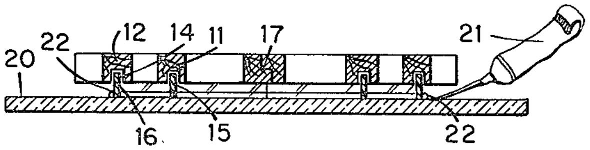
FIG. 2 is a cross-section through 2—2 of FIG. 1 positioned upside down on a glass sheet.
Figure 3:
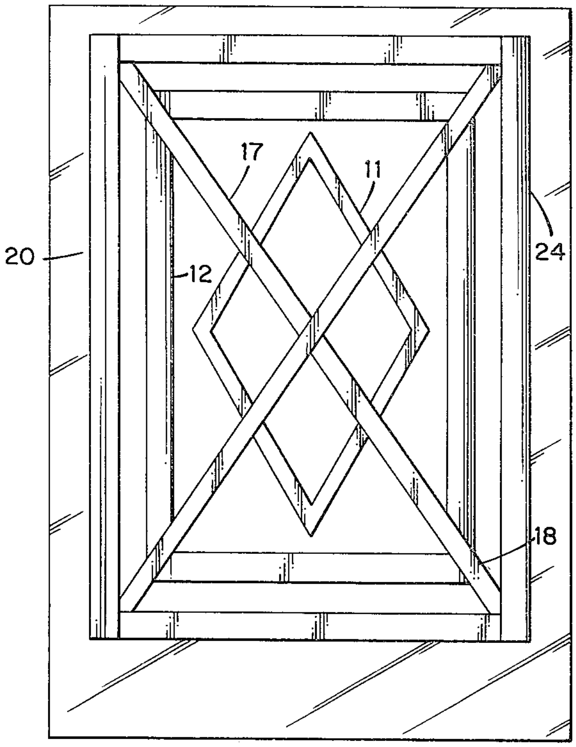
FIG. 3 is a plan view according to FIG. 2 with a retaining wall added.

After the plastic strips 15 and 16 have been inserted into grooves 14, frame assembly 10 is turned upside down onto mold plate 20. FIGS. 2 and 3 depict plate 20 as a sheet of glass. Other types of mold plates may be used having glassy surfaces to provide a gloss finish on the plastic layer. Where other than a gloss finish is desired, matte or striated mold surfaces may be used with careful application of appropriate release agents. Strips 15 and 16 support frame assembly 10 spaced above plate 20 as depicted in FIG. 2.

Strips 15 and 16 must be made to adhere to plate 20. Some form of bonding cement may be used. Most readily available polyster resin mixes are suitable and usually a small catalyzed amount of the resin to be molded will serve the purpose. While the cement may be applied to the strips before placing assembly 10 on plate 20, it has been found convenient to apply the cement in a small bead along the contact between strips 15 and 16 and plate 20. FIG. 2 depicts the use of applicator 21 applying bead 22 of cement to the edge of strip 16.

Retaining walls 24 are assembled on plate 20 as depicted in FIG. 3. These retaining walls may be made of wood, metal or plastic finished with an interior surface having the desired mold finish. A glassy surface for molding a high gloss finished product has been obtained by cementing a high pressure plastic laminate to the interior surfaces of wooden walls 24. As depicted in FIG. 3, walls 24 are assembled from four pieces that are aligned into position using legs 18 as alignment guides. Walls 24 must be secured together and to plate 20. This may be done in various ways. Clamps (not shown) are probably the best. Walls 24 may also be secured with cement, screws or other convenient means.

Figure 4:
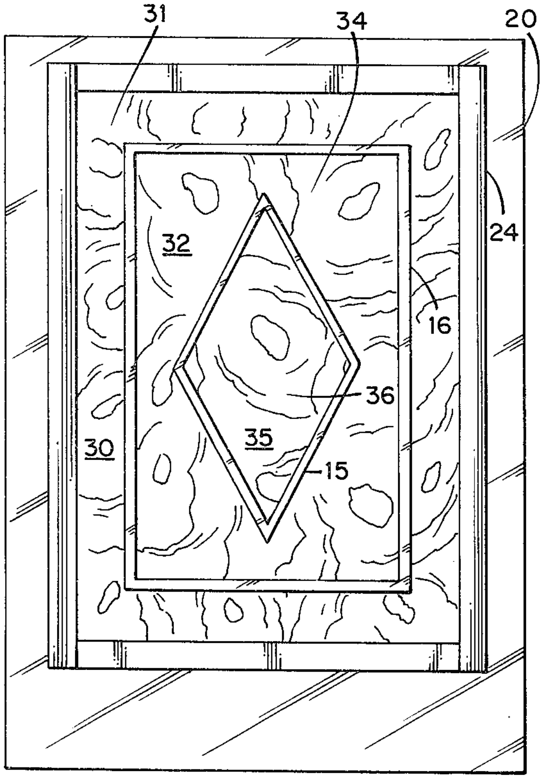
FIG. 4 is a plan view depicting the addition of a plastic mix.
Figure 5:
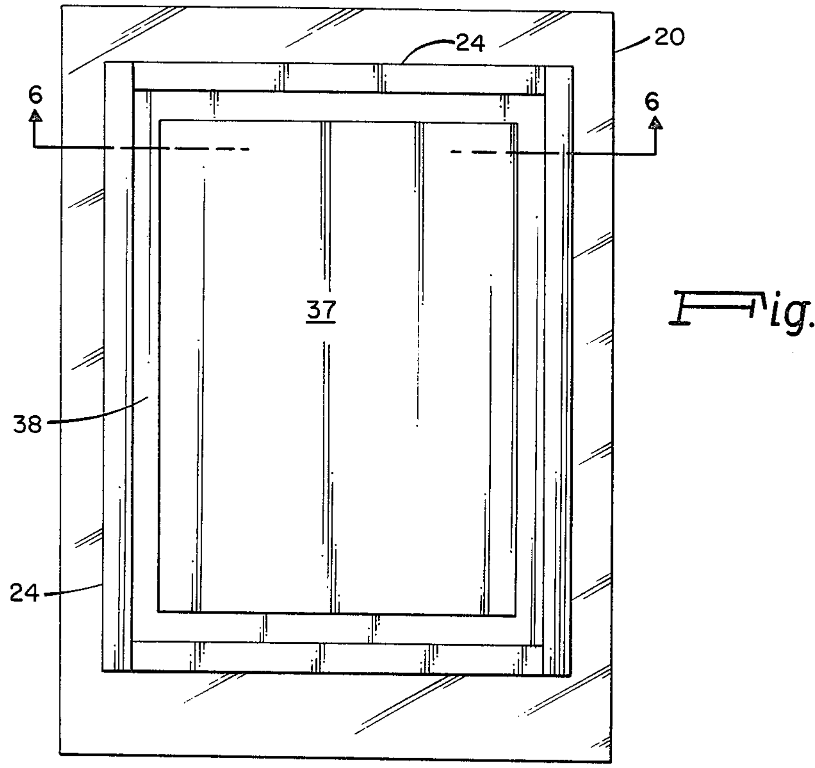
FIG. 5 is a plan view depicting the addition of a wooden core with additional plastic mix as a border.
Figure 6:
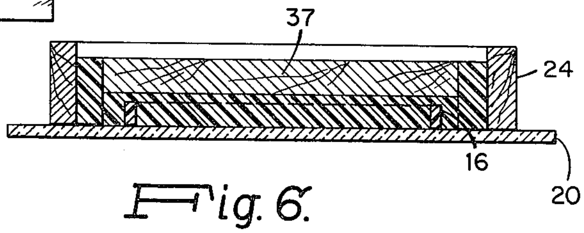
FIG. 6 is a cross-section through 6—6 of FIG. 5.

After walls 24 are secured in place, frame assembly 10 is removed leaving strips 15 and 16 cemented to plate 20 as shown in FIG. 4. Plate 20 and walls 24 together constitute the mold into which a plastic mix is poured. At this stage there are a number of choices depending on the decorative effect desired. The decorative pattern may be provided entirely by strips 15 and 16 in which case the mold is filled with a single homogenous plastic mix. Any plastic mix suitable for making molded table tops and the like may be used. Polyester and epoxy resin mixes that are mixed with a catalyst before pouring are commonly used. These mixes usually contain a filler material both to lower cost and enhance appearance. Pieces, chips and or granules of marble, granite, other stone or silica materials, plastic, glass, metal, etc. can be added as well as coloring.

It is contemplated to use the divider strips 15 and 16 primarily to separate different plastic mixes. For example, marble chips can be added to the plastic for the entire layer, then the plastic for each divided area can be colored with different coloring. The border area 30 can be poured with plastic 31 colored dark, area 32 between strips 16 and 15 can be poured with plastic 34 colored light and area 35 inside strips 15 may be poured with plastic 36 colored a still different shade or different color. Where sizeable pieces or chips of marble or other filler material are used, it has been found desirable in some cases to press these into the plastic right after it has been poured rather than premixing.

EXAMPLE

Figure 7:
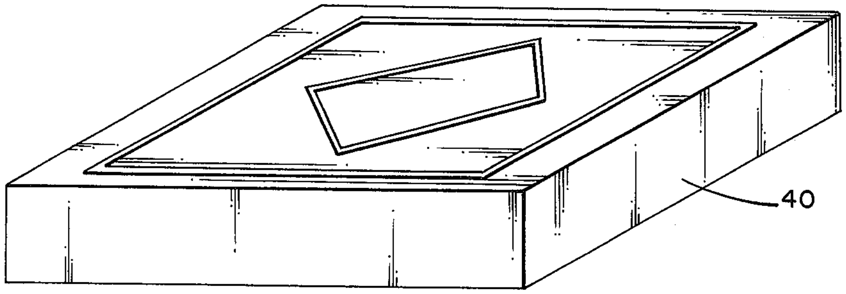
FIG. 7 is an oblique drawing of the layer of FIG. 5 removed from the mold.

Catalyzed polyester resin is poured into the outer section to a depth of one half the height of the divider strips. Marble chips of the selected size and color are immediately sprinkled into the resin in a quantity sufficient to fill the section to the remaining height of the divider strips. A spatula is used to level the resin and push the marble chips into the resin. Each section is filled in turn until the mold plate is completely covered within the retaining walls. As catalyzed polyester resins usually begin to gel quickly, it is important that the full sequence of steps be carried out without interruption. Next a small quantity of homogeneous catalyzed polyester resin is poured over the whole layer and wood core panel 37 is applied. Panel 37 of the example is two centimeters thick and of dimensions to leave a three centimeter border between it and walls 24. Five millimeter holes drilled every ten centimeters in panel 37 allow air to escape and provide better adhesion. The void between panel 37 and retaining walls 24 is partially filled with plastic mix 38 of the same type used in the outermost section. Marble chips are added to fill the void level with panel 37 and the chips are tamped in with the spatula until none protrude. More catalyzed resin is added and spread to provide a smooth surface covering panel 37. The plastic resin is given time to cure after which walls 24 are removed one at a time and then finished layer 40 is separated from mold plate 20 (FIG. 7).

The adhesion of cured polyester resin to a glassy surface is good enough to hold strips 15 and 16 in place while pouring the mold, but poor enough to permit ready separation of the mold surfaces.

While the invention has been described with relation to specific embodiments, the method is applicable to a wide variety of applications and it is intended to cover the invention within the full scope of the appended claims.

I claim:

1. A method of producing a plastic ornamental layer comprising:
   (a) Constructing a first frame having members corresponding to dividing lines in the ornamental layer to be produced;
   (b) securing dividing strips to said members;
   (c) placing said first frame with dividing strips down on top of a mold plate;
   (d) applying adhesive to bond said strips to said mold plate;
   (e) constructing a second frame having an inner face as a mold wall defining the boundaries of the layer being produced;
   (f) securing said second frame to said mold surface about said first frame;
   (g) removing said first frame leaving said strips bonded to said mold surface;
   (h) filling the space within said second frame to a predetermined level covering said strips with a curable plastic mix;
   (i) curing said plastic mix to form a hardened layer;
   (j) removing said second frame; and,
   (k) removing the cured layer from said mold surface with said strips embedded in said layer.

2. A method according to claim 1 wherein constructing said first frame comprises constructing a plurality of subframes and interconnecting said subframes to form a unitary frame assembly in which each of said subframes defines a pattern section of the ornamental layer to be produced.

3. A method according to claim 1 wherein said first frame is constructed with extended portions that index the positioning of said second frame.

4. A method according to claim 1 wherein said securing dividing strips comprises cutting grooves along said members and inserting said dividing strips into said grooves.

5. A method according to claim 1 wherein said strips delineate a plurality of divided sections and said filling comprises filling each of said sections with a different plastic mix to produce a decorative pattern.

6. A method according to claim 5 wherein said different plastic mix is determined by adding filler materials of different characteristics to a plastic resin.

7. A method according to claim 1 wherein filling the space within said second frame is followed by adding a core panel on top of the uncured plastic and filling a border area around said core panel and inside said second frame with additional plastic mix.

8. A method according to claim 1 wherein said constructing a second frame comprises applying a material having a glassy surface to the interior of said second frame.

9. A method according to claim 1 wherein said dividing strips are constructed with a thickness of 1 to 5 mm. and a width of 5 to 10 mm.

* * * * *